UNITED STATES PATENT OFFICE.

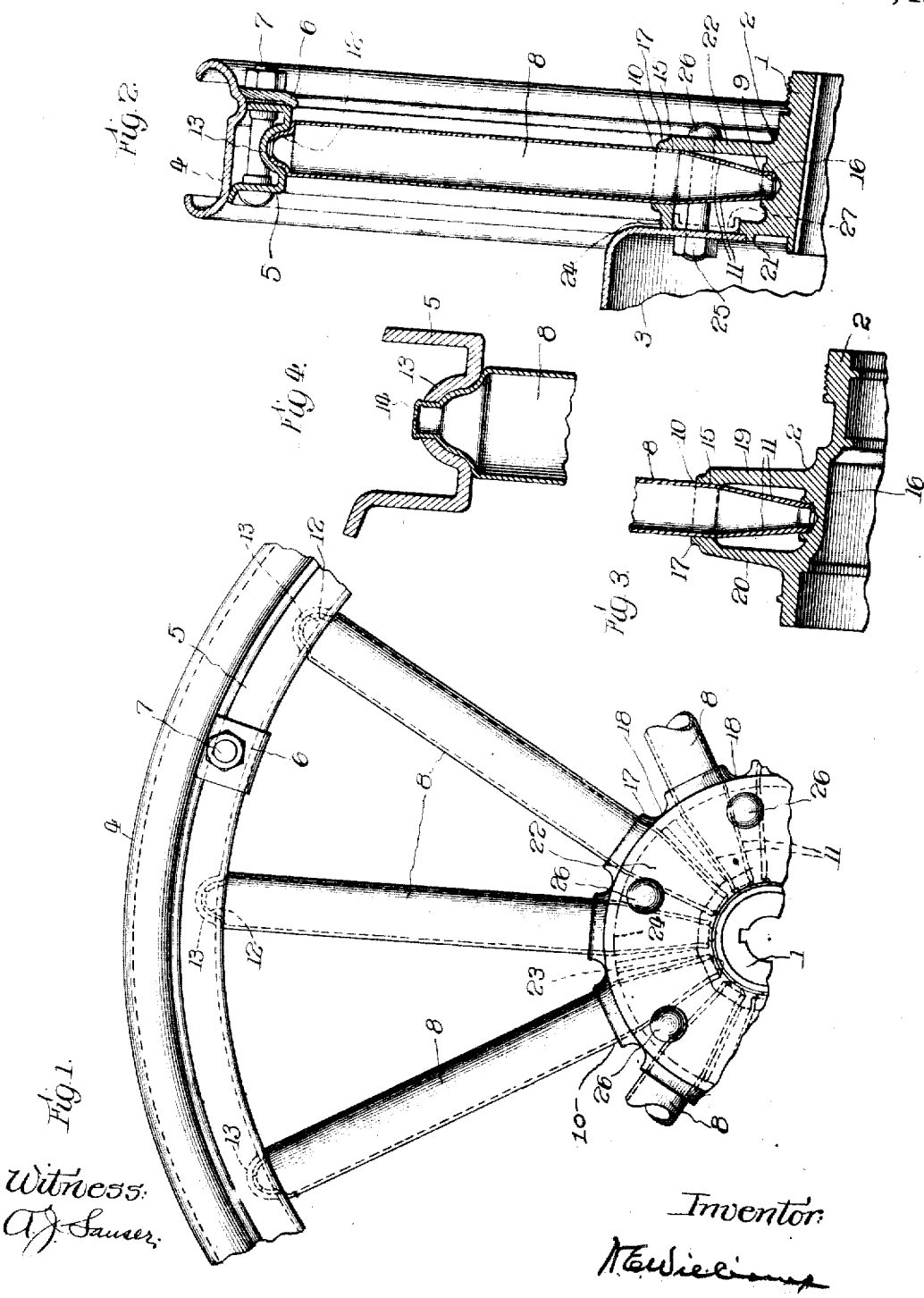

WILLIAM ERASTUS WILLIAMS, OF CHICAGO, ILLINOIS.

TUBULAR-SPOKED WHEEL.

1,408,790.        Specification of Letters Patent.        Patented Mar. 7, 1922.

Application filed June 16, 1921. Serial No. 478,027.

*To all whom it may concern:*

Be it known that I, WILLIAM ERASTUS WILLIAMS, a citizen of the United States, a resident of Chicago, in the county of Cook and State of Illinois, have invented a new and useful Improvement in Tubular-Spoked Wheels, of which the following is a specification.

My invention relates to wheels that have their spokes made out of metal tubes and the object of the invention is to provide a wheel that may be cheaply made and arrive at a maximum strength of the parts and furnish a durable wheel for service.

Reference will be had to the accompanying drawing in which Figure 1 is an elevation of part of the wheel.

Figure 2 is a radial section in the axis of a spoke.

Figure 3 is a hub detail.

Figure 4 is a rim detail showing a modified construction.

In the drawing 1 indicates the hub of an ordinary automobile wheel, the rear hub being indicated in Figures 1 and 2, and 2 indicates the hub for the front wheel. 3 the ordinary brake drum, 4 an ordinary clincher demountable rim, and 5 a steel felloe more or less analogous to the steel felloes in common use with wooden spoke wheels. As with wood wheels, modifications in the way of securing the rim to the felloe may be made.

In this case the demountable rim 4 is held in place on the steel felloe 5 by means of a series of clips 6 secured by bolts 7, but as before stated other fastening means may be employed.

The tubular spokes of this wheel are indicated by 8 and are made of tubing of any suitable material, but I prefer to use what is known as seamless or welded tubing.

Previous to the assembly of the tubes 8 into the wheel the ends that go into the hub are swaged down or tapered, having their inner ends 9 considerably smaller in diameter where they bear in the central portion of the hub than the body of the tube where it fits into the outer margin of the hub at 10. The swaging down or tapering down of these ends of the tube results in thickening the wall of the tube as indicated by the thickened zone 11. Of course, this thickening increases as the diameter decreases. The outer or felloe end 12 of each tube or spoke is swaged to fit a rounded seat 13 in the felloe, the tube being thereby compressed and the metal as being necessarily thickened in the operation.

I may, when desired, perforate the bottom of these sockets 13 in the steel felloe as indicated by Figure 4 and then allow the swaged end of the tubular spokes to protrude through this socket 13 and be swaged over on the ends as indicated by 14 in Figure 4, whereby the union resists both tension and compression strains. In the manufacture of these wheels the first steps are to form the spokes out of the tubing with the swaged ends as described and prepare the hubs, having a finished bearing in the region 15 and 16 where the spokes fit into the hub. These bearings 15 and 16 I prefer to make with parallel walls to facilitate the manufacture, so that an ordinary drill or a rimmer of a straight pattern may be run into the hub cavities and making them exactly true for the main body of the spoke at 10 and the smaller end 9, so that tight fits at these two points will be arrived at. These bearing seats 15 and 16 in the hub are made a little smaller than the tubular spoke ends and the spokes which have in-bent terminal flanges, are pressed forcibly into their seats 15, 16 and against the bottoms of the latter.

For convenience in washing and the appearance of the wheel the margins of the hub sockets are rounded off as is indicated by 17, leaving the little rounded valleys 18 between the several spokes. After the spokes are assembled in the hub, furnishing as it were wheel spiders, the steel felloe is contracted on to the ends of the spokes in a manner that has been heretofore practiced in various ways in the manufacture and the tightening up of wheel ends and felloes on to the spoke ends.

I prefer to press home each individual spoke in its right position before applying the felloe, but I may make the felloe larger, place the spokes in the proper lines, and then upset the metal of the felloe and force all the spokes home simultaneously.

The front wheel hub connection is shown in Figure 3 and in this instance the spoke supporting part of the hub is composed of the front hub flange 19 and the rear hub flange 20 which are connected across between the spoke openings in the valleys 18 as previously mentioned and thus there are no bolted on flanges of any type.

In the case of the rear wheel, however, where the brake drum is applied to the hub, a small flange 21 seats this brake drum, and the hub is provided with a front flange 22 only which may as desired be stiffened across by transverse ribs indicated by dotted lines 23 in Figure 1 and there is provided the annular finished flange 24 against which the brake drum is clamped by a series of bolts 25 having the rounded heads 26 on the outer face of the wheel.

I may as desired, use substantially the same feature of hub casting for the front wheel as relates to the spoke seats as I do for the rear wheel and then cover up the space in the front wheel with a separate ring or thin pressed metal instead of the brake drum covering it as is the case where the brake drum is used and I have indicated by 27 the position, of this thin pressed metal, in dotted lines in Figure 2.

This method of making the hub socket section of the hubs leaving open the side wall as shown covered by the brake drum or by the piece 27, permits a little easier method of supporting the cores for casting the spoke sockets than is the case with the structure shown in Figure 3, as in Figure 3 the core prints must stick out through the spoke socket holes while with the hub as shown in Figure 2 the cores may be supported from the side or the cavity covered by the brake drum or plate 27 and the spoke cavity which is to be machine finished, may be left solid and drilled out of the solid, which may be preferred by some manufacturers as a method of doing the work.

In swaging down the ends of the tubes to form the spoke ends as described, I prefer to do this work when the metal of the tubing is heated, yet with certain qualities of metal this swaging operation may be done when the metal is cold.

I am advised that heretofore in wheels of this type, securing the spokes in the hub has required undue expense, for example, in adding parts, in forming peculiar spoke ends, and in welding and riveting, but when my methods are used a wheel of this type competes in low cost, weight and strength with ordinary wheels of any type.

The arrangement of the hub sockets for the spokes having the finished bearing seats 15 and 16 with clearance spaces between these seats insures that the spokes will take the skid shock loads at the points intended and with no uncertainty as to this feature being occasioned by a lack of attention or carelessness of the fitting of the parts.

What I claim is:—

1. A tubular spoke having its end portion swaged to tapered form with the walls of the tapered portion increasing in thickness as the diameter decreases.

2. The combination with a hub body having peripheral spoke sockets materially smaller than the body of the spokes, of spokes swaged to form portions tapering toward the spoke ends and having the converging walls thickened as the diameter decreases, said portions being primarily slightly larger than the sockets but forced into the same.

3. In a wheel of the class described, a tubular spoke having a tapered end and secured in the hub by being pressed radially into seats adapted to receive the tapered ends; in combination with a felloe contracted on to the ends of the tubular spokes.

4. In a wheel of the class described, a tubular spoke having a tapered end and secured in the hub by being pressed radially into seats adapted to receive the tapered ends; in combination with a felloe contracted on to the ends of the tubular spokes, with an initial tension in the felloe exerting compression on the ends of the spokes in the normal assembly.

5. In a wheel of the class described, a steel felloe substantially in channel form having radially embossed pockets in the web of the channel; in combination with tubular spokes having contracted ends adapted to seat in the pockets of the felloe and said spokes suitably secured into the hub.

6. In a wheel of the class described, a steel felloe having the form of an outwardly open channel provided with a series of spoke end pockets embossed in the web of the channel and with a small perforation in the deepest portion in the pocket; in combination with tubular spokes having contracted ends shaped to be seated in the pockets of the steel felloe and with the ends of the contracted ends of the spokes swaged over, making a fastening of the spoke ends into the pockets of the felloe.

7. In a wheel of the class described, a hub having spoke sockets and each socket provided with an outer bearing and an inner bearing for a spoke end and the inner bearing being smaller in diameter than the outer bearing, with clearance spaces in between the bearings.

8. In a wheel of the class described, a hub having spoke sockets and each socket provided with an outer bearing and an inner bearing for a spoke end, the inner bearing being smaller in diameter than the outer bearing, and the walls of these bearings being substantially parallel with the axis of the spoke.

9. In a wheel of the class described, tubular spokes having tapered circular ends where they fit into the hub, hub sockets in the hub adapted to receive the ends of the said spokes and having bearings at the outer margin of the hub sockets and on the inner ends of the hub sockets with clearance spaces between the two bearing surfaces in a manner that the spoke is engaged at the inner end of the spoke and at the outer end of the hub socket only.

10. A hub having sockets adapted to hold spokes terminally and at some distance from their ends while leaving the intermediate portions free, and having plate-closed apertures to the space between the regions where the spokes are held.

11. In a wheel of the class described, the combination with a spoke having a tapered inner-end portion, of a hub having corresponding peripheral sockets encircling the spokes at their ends at some distance therefrom and laterally open, normally at points between the encircling portions, and a member closing the lateral openings.

12. In a wheel of the class described, a metal felloe substantially channel shaped in cross section, a tire carrying rim secured to the said felloe in demountable fashion, tubular spokes upon which the said felloe is mounted by radial compression upon the ends of the spokes, said spokes having their inner ends rigidly held by a suitable hub.

Signed at Chicago, in the county of Cook and State of Illinois, this 13th day of June, 1921.

WILLIAM ERASTUS WILLIAMS.

Witnesses:
B. J. BERNHARD,
F. M. ZOBEL.